UNITED STATES PATENT OFFICE.

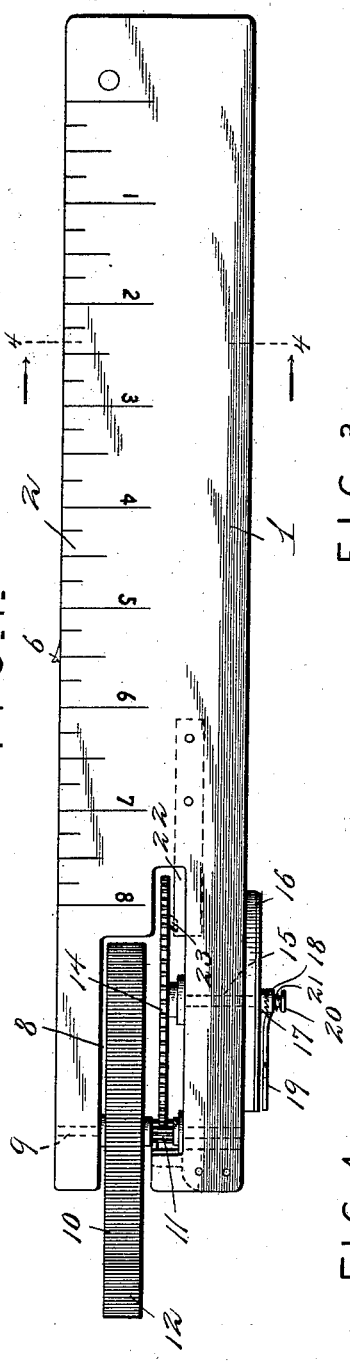
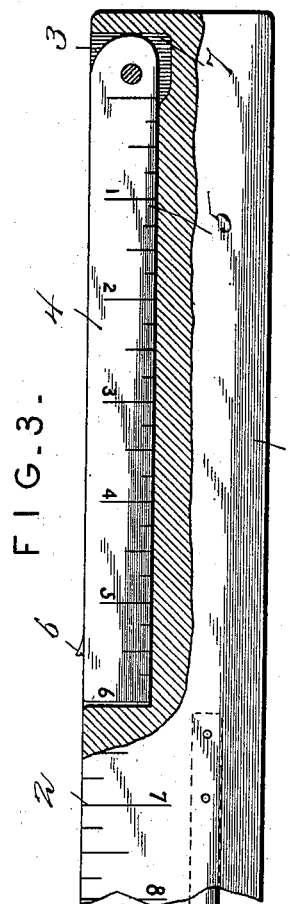
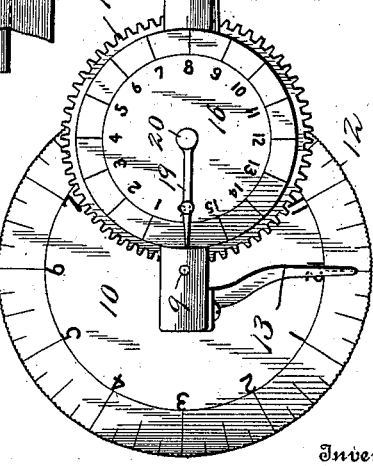

HARLEY SMITH, OF BUFFALO, MISSOURI.

MEASURING DEVICE.

SPECIFICATION forming part of Letters Patent No. 718,396, dated January 13, 1903.

Application filed April 22, 1902. Serial No. 104,191. (No model.)

*To all whom it may concern:*

Be it known that I, HARLEY SMITH, a citizen of the United States, residing at Buffalo, in the county of Dallas and State of Missouri, have invented new and useful Improvements in Measuring Devices, of which the following is a specification.

This invention relates to a measuring device for lumber and other purposes of that class embodying a construction whereby lineal measures may be taken and automatically registered where the distance is greater than the circumference of the measuring-wheel embodied in the organization of the device; and the object of the present improvement is to provide a simple and effective measuring device capable of indicating the number of superficial feet contained in boards and strips of different lengths and having structural features whereby the operator will be apprised regularly when a certain number of feet have been registered without requiring the stoppage of the movement of the instrument of the device to note such number of feet, and thereby accurately assist the operator in keeping tally of the number of feet measured.

The invention consists in the construction and arrangement of the several parts, which will be more fully hereinafter described and claimed.

In the drawings, Figure 1 is a top plan view of a measuring device embodying the features of the invention. Fig. 2 is a side elevation of the same. Fig. 3 is a top plan view of a portion of the device broken away to show a foldable square attachment. Fig. 4 is a transverse vertical section on the line 4 4, Fig. 1.

Similar numerals of reference are employed to indicate corresponding parts in the several views.

The numeral 1 designates a stock, which is preferably formed from a suitable strip of wood, though it may be made of metal, if desired, and having along one edge scale-marks 2, designating feet or inches and fractions thereof. The edge of the stock 1 adjacent the scale-marks 2 is formed with a horizontal slot or pocket 3, wherein a square blade 4 is movably mounted and pivotally connected at one end, the said square blade also having scale-marks 5 thereon and provided at its outer edge, near the free end thereof, with a projection 6, by which the blade may be withdrawn from the slot or pocket 3 by application of the finger-nails thereto. When the square blade 4 is opened to its full extent, it is braced against the end wall 7 of the slot or pocket 3, and the latter adjacent the said wall is enlarged to compensate for the free movement of the adjacent terminal of the said square blade.

The end of the stock 1 opposite that to which the square blade is pivoted is formed with a slot 8 of such shape as to accommodate the disposition therein of movable parts which will now be referred to. On a transversely-extending shaft 9 in the slotted end of the stock 1 a measuring-wheel 10 is rotatably held and has a lantern-wheel 11 or analogous gear secured thereto. This measuring-wheel is radially divided adjacent its periphery by scale-marks designating inches and fractions of the latter and is also formed with a milled or roughened periphery 12 to set up a practical adhesion between the wheel and the material measured thereby. Depending from the end of the stock 1 is an immovable pointer or indicator 13 to coöperate with the measuring-wheel 10, the free extremity of the pointer or indicator being in vertical alinement with the axis of the said wheel. Meshing with the lantern-wheel 11 is a spur pinion or gear 14, fixed on a shaft 15, which extends through an immovable dial 16, fastened to the edge of the stock adjacent to the location of the pointer or indicator 13, which is radially divided by scale-marks into feet, running from "1" to "16." The shaft 15 is freely rotatable and has a clutch member 17 adjacent to its outer end and fixed thereon to rotate therewith. Coöperating with this clutch member 17 is a clutch member 18, movable on the outer end of the shaft and carrying a pointer or indicator 19, adapted to rotate over the face of the dial 16. The outer end of the shaft 15 is provided with a flanged head 20, and between the said head and the movable clutch member 18 a spring 21 is interposed, which strongly holds the said clutch member 18 in engagement with the clutch member 17. By drawing outwardly on the pointer or indicator 19 and its clutch member 18 the latter will be separated from the clutch member 17, and said pointer or indicator can be turned backwardly to a starting-point on the dial without rotating the shaft, and by this means a convenient structure is provided for resetting the device in an expeditious manner.

In the use of measuring instruments of this class the operator frequently loses or forgets the number of feet and fractions thereof recorded through inattention and failure to carefully observe the indicating or recording means, especially in long measurements. The present measuring device is equipped with means to overcome this disadvantage, and comprises a flat spring-click 22, secured to the under side of the stock and having a portion of the one side of the free extremity thereof exposed at the inner terminal of the slot 8 adjacent to the spur-gear 14, and the latter has a projection 23 thereon which contacts with the click at regular intervals or when the spur-gear has made a complete revolution. The parts are so proportioned and arranged that when the spur-gear makes a complete revolution the pointer or indicator 19 will have made one complete revolution over the face of the dial 16 and sixteen feet will have been recorded. When the projection 23 engages and pushes past the click 22, a sound will be given forth which will attract the attention of the operator and inform him that sixteen feet have been measured and recorded, and in measuring long lengths of lumber the operator can more easily keep account of the number of clicks and have in mind the total number of feet measured without having to continually refer to the dial 16. The number of inches and fractions thereof will be shown by the measuring-wheel 10, and in setting the said wheel for work it is turned until the "12" mark coincides with the pointer or indicator 13.

In the operation of the device it is first set as heretofore explained and then pushed forwardly along the lumber or timber to be measured and a record kept of the number of feet and inches corresponding to the length of the lumber or timber over which the wheel 10 moves. It will be understood that the wheel 10 will have an exact circumferential measurement of twelve inches or one foot, as indicated, and the spur-gear 14 and lantern-wheel 11 are so proportioned that sixteen revolutions of the wheel 10 must ensue before the pointer or indicator 19 moves the corresponding sixteen feet or points on the dial 16. It is also obvious that a less number of feet measured will be shown on the dial, and, furthermore, changes in the divisions, as well as the proportion, of the several parts may be made at will.

The square attachment, heretofore described, is also an important and advantageous addition to the present improved instrument or measuring device. The several parts of the improved device are also simple in their construction and arrangement and are not liable to get out of order or become materially worn by long usage.

Having thus fully described the invention, what is claimed as new is—

1. A measuring device of the class set forth, comprising a flat elongated stock adapted to be held horizontally when in use and formed with a slot extending inwardly through one end thereof, a vertically-disposed stationary dial located on one side edge of the stock adjacent to the slot in the latter and having an indicator movable thereover, a vertically-disposed measuring-wheel mounted in the said slot and having scale-marks thereon, gearing actuated by the measuring-wheel for operating the indicator, a rigid indicator depending from the under side of the slotted end of the stock and coöperating with the scale-marks on the measuring-wheel, and a click device actuated by the gearing to indicate when a certain number of feet have been measured.

2. A measuring device comprising an elongated flat stock adapted to be disposed horizontally when in use and having a slot extending inwardly through one end thereof, a measuring-wheel rotatably mounted in the said stock and provided with scale-marks on one face thereof, a vertically-disposed stationary dial secured to one side edge of the stock adjacent to the slot in the latter, an indicator movable over the said dial, an arbor for rotating the said indicator, means being provided between the said arbor and indicator for releasing the latter from the arbor to adapt it to be reset, gearing actuated by the measuring-wheel for operating the indicator and including a spur-gear provided with a projection, and a flat spring-click secured to the under side of the stop and extending outwardly in the path of movement of the projection on the spur-gear.

In testimony whereof I affix my signature in presence of two witnesses.

HARLEY SMITH.

Witnesses:
FLOYD O'BANNON,
E. M. CHEEK.